US010104342B2

(12) United States Patent
Nanda et al.

(10) Patent No.: US 10,104,342 B2
(45) Date of Patent: Oct. 16, 2018

(54) TECHNIQUES FOR SECURE PROVISIONING OF A DIGITAL CONTENT PROTECTION SCHEME

(71) Applicant: INTEL CORPORATION, Santa Clara, CA (US)

(72) Inventors: Akshat Nanda, El Dorado Hills, CA (US); Changliang Wang, Bellevue, WA (US); Scott W. Cheng, Folsom, CA (US); Michael L. Coulter, Chandler, AZ (US)

(73) Assignee: INTEL CORPORATION, Santa Clara, CA (US)

( * ) Notice: Subject to any disclaimer, the term of this patent is extended or adjusted under 35 U.S.C. 154(b) by 0 days.

(21) Appl. No.: 14/133,050

(22) Filed: Dec. 18, 2013

(65) Prior Publication Data

US 2015/0172600 A1   Jun. 18, 2015

(51) Int. Cl.
| | |
|---|---|
| *H04L 29/06* | (2006.01) |
| *H04N 7/167* | (2011.01) |
| *G11B 20/00* | (2006.01) |
| *H04N 21/426* | (2011.01) |
| *H04N 21/4367* | (2011.01) |
| *H04N 21/4385* | (2011.01) |
| *H04N 21/4405* | (2011.01) |
| *H04N 21/443* | (2011.01) |

(Continued)

(52) U.S. Cl.
CPC ..... *H04N 7/1675* (2013.01); *G11B 20/00224* (2013.01); *H04N 21/42623* (2013.01); *H04N 21/4367* (2013.01); *H04N 21/43853* (2013.01); *H04N 21/4405* (2013.01); *H04N 21/4433* (2013.01); *H04N 21/4627* (2013.01); *H04N 21/8355* (2013.01)

(58) Field of Classification Search
CPC ........... H04N 7/1675; H04N 21/42623; H04N 21/4367; H04N 21/8355; H04N 21/4405; H04N 21/4433; H04N 21/4627; H04N 21/43853
USPC .......................... 380/44, 201–216; 713/189
See application file for complete search history.

(56) References Cited

U.S. PATENT DOCUMENTS

2004/0221304 A1 * 11/2004 Sparrell et al. ................ 725/34
2004/0260798 A1 * 12/2004 Addington et al. .......... 709/223

(Continued)

OTHER PUBLICATIONS

"Federal Information Processing Standards Publication 197 Announcing the Advanced Encryption Standard (AES)", promulgated by the National Institute of Standards and Technology (NIST) as , Nov. 26, 2001 (Author unknown), 51 pgs.

(Continued)

*Primary Examiner* — Amir Mehrmanesh

(57) ABSTRACT

Techniques for improved decryption of an encrypted media stream are described. In one embodiment, a system may include a receiver to receive an encrypted media stream, an extraction module to extract an encryption characteristic of the encrypted media stream, a first processor to produce configuration commands from the extracted encryption characteristic, a second processor to receive the encrypted media stream and the configuration commands, and to produce decrypted media based upon a decryption scheme indicated by the configuration commands, and a key distribution module, to distribute a decryption key to the second processor.

11 Claims, 7 Drawing Sheets

(51) Int. Cl.
*H04N 21/4627* (2011.01)
*H04N 21/8355* (2011.01)

(56) References Cited

U.S. PATENT DOCUMENTS

| | | | |
|---|---|---|---|
| 2006/0093138 A1* | 5/2006 | Durand et al. | 380/44 |
| 2008/0063196 A1 | 3/2008 | Evans et al. | |
| 2010/0272257 A1* | 10/2010 | Beals | 380/216 |
| 2011/0055864 A1* | 3/2011 | Shah et al. | 725/31 |
| 2011/0299680 A1 | 12/2011 | Vembu et al. | |
| 2011/0317831 A1 | 12/2011 | Passera et al. | |
| 2012/0173877 A1 | 7/2012 | Pendakur et al. | |
| 2013/0145424 A1 | 6/2013 | Wang et al. | |
| 2013/0290737 A1* | 10/2013 | Shuster | 713/189 |
| 2014/0044258 A1 | 2/2014 | Grewal et al. | |

OTHER PUBLICATIONS

Raeburn, K., "Advanced Encryption Standard (AES) Encryption for Kerberos 5," Request for Comment (RFC) 3962, Feb. 2005, 16 pgs.
Extended European Search Report received for European Patent Application No. 14191971.2, dated Jun. 22, 2015, 11 pages.
Cook et al., "Remotely Keyed Cryptographics Secure Remote Display Access Using (Mostly)Untrusted Hardware", Information and Communications Security Lecture Notes in Computer Science, Jan. 1, 2005, 13 pages.
Rott, Jeffrey, "Intel Advanced Encryption Standard Instructions (AES-NI)", <http://software.intel.com/en-us/articles/intel-advanced-encryption-standard-instructions-aes-ni>, Feb. 2, 2012, 5 pages.
Gilger et al., "GPU-Acceleration of Block Cyphers in the OpenSSL Cryptographic Library", Information Security, Sep. 19, 2012, 16 pages.

* cited by examiner

200

350

300

400

500

600

700

TECHNIQUES FOR SECURE PROVISIONING OF A DIGITAL CONTENT PROTECTION SCHEME

BACKGROUND

As mobile low-power devices such as tablets and smart phones become more popular playback devices for protected audio/video content such as encrypted video, music and the like, it becomes more important to provide power-efficient audio/video processing solutions such as high quality video playback and video conferencing. Video playback and video conferencing solutions need content security so that, e.g., malicious software is not able to access, copy, or otherwise steal the content.

A variety of encryption schemes are commercially available to secure the content, for example the Advanced Encryption Standard (AES), promulgated by the National Institute of Standards and Technology (NIST) as Federal Information Processing Standards Publication 197, Nov. 26, 2001. AES is a symmetric encryption scheme, such that a same cipher key is used for both encoding and decoding. The AES scheme itself exists in multiple variations, such as AES counter mode, AES cipher block chaining (CBC)+cipher text stealing (CTS), RSA, and so forth. Some variations of AES may be described in Request for Comment (RFC) 3962, "Advanced Encryption Standard (AES) Encryption for Kerberos 5," February 2005, and references cited therein. The variety of encryption schemes impose different limitations on encryption and decryption implementations. The limitations affect video processing pipelines, which include hardware modules. Accordingly, a need exists for more flexible encryption scheme implementations for low-power devices.

DETAILED DESCRIPTION

Various embodiments may be generally directed to techniques for improved decrypting and usage of an encrypted media content or media stream on a portable device. In one embodiment, for example, an apparatus may comprise a programmable co-processor that is configurable to use a selectable decoding and/or decrypting scheme, from among a plurality of schemes, to decode and/or decrypt a protected audio/video. Other embodiments may be described and claimed.

Various embodiments may comprise one or more elements. An element may comprise any structure arranged to perform certain operations. Each element may be implemented as hardware, software, or any combination thereof, as desired for a given set of design parameters or performance constraints. Although an embodiment may be described with a limited number of elements in a certain topology by way of example, the embodiment may include more or less elements in alternate topologies as desired for a given implementation. It is worthy to note that any reference to "one embodiment" or "an embodiment" means that a particular feature, structure, or characteristic described in connection with the embodiment is included in at least one embodiment. The appearances of the phrases "in one embodiment," "in some embodiments," and "in various embodiments" in various places in the specification are not necessarily all referring to the same embodiment.

As used herein, the term "module" refers generally to a logical sequence or association of steps, processes or components. For example, a software module may comprise a set of associated routines or subroutines within a computer program. Alternatively, a module may comprise a substantially self-contained hardware device. A module may also comprise a logical set of processes irrespective of any software or hardware implementation.

Figure 1:
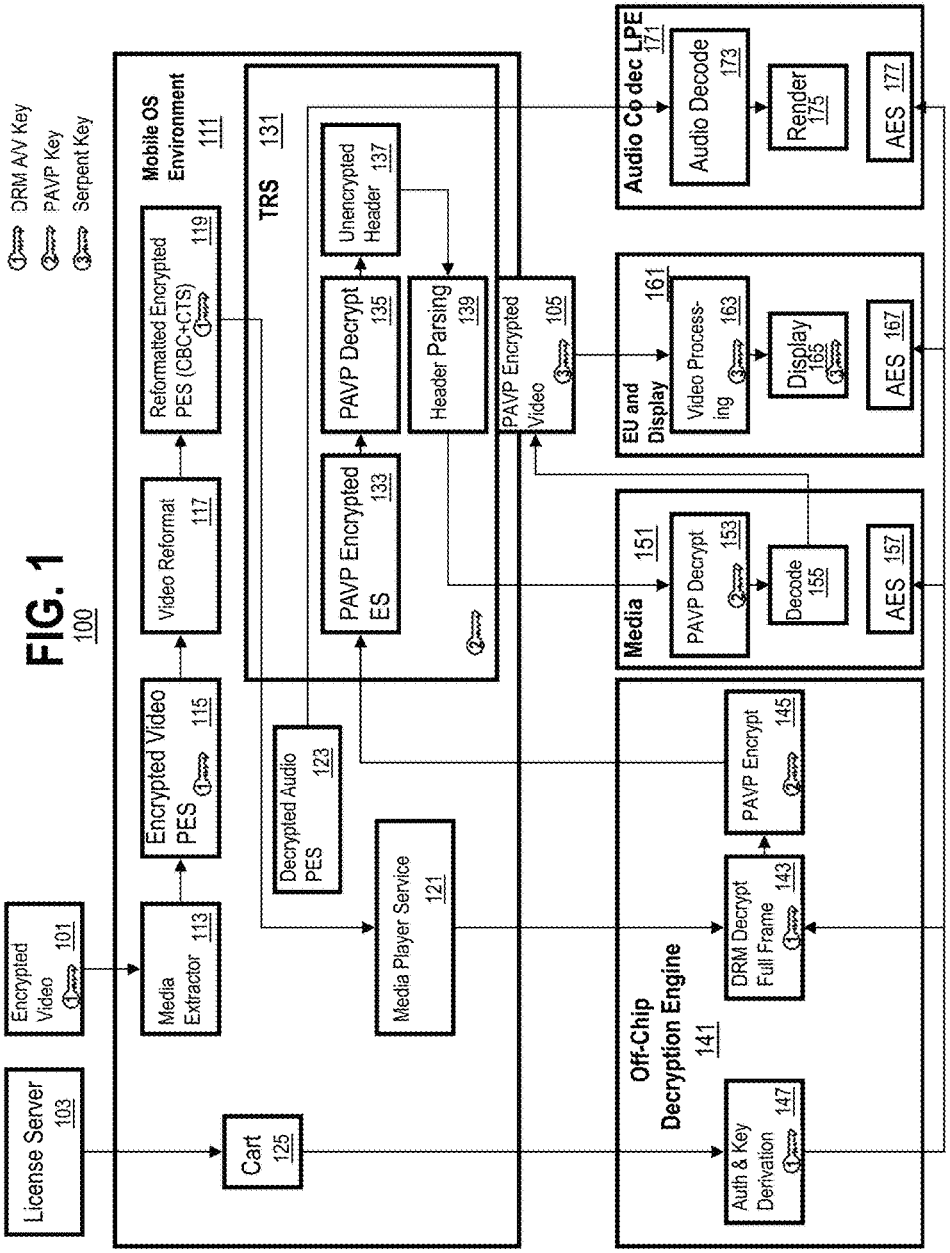
FIG. 1 illustrates a system to decode and decrypt a media content.

Conventional design of a PC, tablet, smart phone or similar portable computing devices includes fixed (e.g., dedicated) hardware functions for pipelined video computations, including computations to support encryption and/or decryption of an audio and/or video media or media stream. Such functions may be implemented in one or more hardware modules. Hardware-based fixed functions usually handle only a limited number of encryption algorithms. The hardware-based functions exchange information on the basis of trust. A combination of application software and graphics drivers are responsible for establishing trust with the hardware through key exchange, and then translating the secure workload such that the hardware fixed function can decrypt the video data for user consumption. FIG. 1 illustrates a system 100 for processing in a video playback model.

System 100 may rely upon a mobile operating system (OS) environment 111, such as an Android™ OS, an iPhone® OS, or Windows Mobile™ OS. System 100 may include an off-chip decryption engine module 141, a media module 151, an end-user (EU) interface and display module 161 and an audio codec module 171, which may be interconnected as illustrated in FIG. 1. Alternative interconnections providing similar functionality may also be used.

Mobile OS environment 111 includes a tamper-resistant software (TRS) module 131, a media extractor module 113 configured to accept an external encrypted video module 101, an encrypted video packetized elementary stream (PES) module 115 configured to accept the output of module 113, a video reformat module 117 configured to accept the output of module 115, a reformatted encrypted PES (CBC+CTS) module 119 configured to accept the output of module 117, a media player service module 121 configured to accept the output of module 119 and supply an output to off-chip decryption engine module 141, a decrypted audio PES module 123 configured to supply an output to audio codec module 171, and a cart module 125 configured to accept the output of license server module 103 and to supply an output to off-chip decryption engine module 141. Components of mobile OS environment 111 may be interconnected as illustrated in FIG. 1. Alternative interconnections providing similar functionality may also be used.

TRS module 131 functions to transform or to translate an encryption format of the media stream to a different encryption format that is more suitable to hardware decryption, and to perform this function in a manner that is resistant to unauthorized copying of decrypted data or software code. Second, TRS module 131 protects intermediate data that may be exposed to or interface with unprotected processing portions of system 100, without changing the nature of the data at all. TRS module 131 includes protected audio video path (PAVP) encrypted ES module 133 configured to accept an output from off-chip decryption engine 141. PAVP supports hardware-accelerated decoding. PAVP may operate in at least two modes. In a first mode, a video stream is encrypted and its decoding is accelerated by the integrated graphics core. In addition, system memory will be reserved exclusively for use by PAVP. In a second mode, the video stream is encrypted and its decoding is accelerated by an integrated graphics core. In the second mode, no system memory will be reserved for use by PAVP. If PAVP is disabled, the hardware-accelerated decoding of video content protected by HDCP is disabled. TRS module 131 further includes a PAVP decrypt module 135 configured to accept the output of module 133, an unencrypted header module 137 configured to accept the output of module 135, and a header parsing module 139 configured to accept the output of module 137 and to supply an output to media module 151. Components of TRS module 131 may be interconnected as illustrated in FIG. 1. Alternative interconnections providing similar functionality may also be used.

Off-chip decryption engine module 141 includes an authentication and key derivation module 147 configured to accept an input from cart module 125. Authentication and key derivation module 147 supplies an output to a digital rights management (DRM) decrypt full frame module 143, to media module 151, to EU and Display module 161, and to Audio Codec module 171. DRM decrypt full frame module 143 further accepts an input from media player service module 121. An output of DRM decrypt full frame module 143 is supplied to a PAVP encrypt module 145. An output of PAVP encrypt module 145 is supplied to TRS module 131 of Mobile OS environment 111. Components of off-chip decryption engine module 141 may be interconnected as illustrated in FIG. 1. Alternative interconnections providing similar functionality may also be used.

Media module 151 includes a PAVP decrypt module 153, which accepts an input from header parsing module 139 of the TRS module 131. PAVP decrypt module 153 supplies an output to decode module 155, which operates using a decryption key received by AES module 157. Decode module 155 supplies an output to PAVP encrypted video module 105, which is affiliated with mobile OS environment 111. PAVP encrypted video module 105 is illustrated as straddling the boundary of mobile OS environment 111 because part of PAVP encrypted video module 105 uses standard function calls (e.g., APIs) from mobile OS environment 111, and part of PAVP encrypted video module 105 uses secure programming code stored in a protected data storage. PAVP encrypted video module 105 allows negation of security provisions across unprotected portions of system 100 (e.g., mobile OS environment 111) and protected portions (e.g., media module 151), and for key management in protected portions of system 100. Components of media module 151 may be interconnected as illustrated in FIG. 1. Alternative interconnections providing similar functionality may also be used.

PAVP encrypted video module 105 supplies an output to EU and display module 161, which includes a video processing module 163 to accept an input from PAVP encrypted video module 105. Video processing module 163 operates using a decryption key received by AES module 167. Decrypted video produced by video processing module 163 is rendered on display module 165, e.g., for user consumption. Components of EU and display module 161 may be interconnected as illustrated in FIG. 1. Alternative interconnections providing similar functionality may also be used.

Decrypted audio PES module 123 is configured to supply an output to audio codec module 171. TRS module 131 may not need to process the output of decrypted audio PES module 123 other than to buffer it and pass it along to Audio codec module 171. Audio codec module 171 includes an audio decode module 173 that accepts an input from the decrypted audio PES module 123. Audio decode module 173 also decrypts the audio using a decryption key received by AES module 177. Decoded and decrypted audio is rendered by rendering module 175, e.g., by a circuit configured to drive earbuds for use by a user. Components of audio codec module 171 may be interconnected as illustrated in FIG. 1. Alternative interconnections providing similar functionality may also be used.

System 100 may use several encryption and decryption keys. For example, modules within system 100 that are marked with a key symbol "1" may use a DRM A/V key. Modules within system 100 that are marked with a key symbol "2" may use a PAVP A/V key. Modules within system 100 that are marked with a key symbol "3" may use a Serpent key, Serpent being known as a symmetric key block cipher which is an alternative to AES. Multiple keys provide different levels of protection, e.g., the DRM A/V key may be used to verify that a holder of the DRM A/V key is entitled to receive the content such as during a user's subscription period, but the PAVP A/V key may be used to encode or decode the content once the right to access it is verified by use of the DRM A/V key. Notably, the DRM A/V key may be used in a security and graphics processing unit (GPU), and the PAVP A/V key may be matched to an encryption/decryption process that is amenable to hardware implementation. Media player service 121 by itself does not need to use keys.

An audio/video stream includes commands to a rendering engine, which instruct the rendering engine how to render the audio or video content. System 100 uses an off-GPU programmable engine (e.g., off-chip decryption engine module 141) to translate commands. The off-GPU engine processes the encrypted stream, then puts the commands into memory, which GPU drivers use to pass the commands to the GPU. Tamper resistance software (TRS) layer is established to ensure that commands that are passed are not accessible to malicious host software.

However, system 100 has drawbacks. First, system 100 is complex because it uses software to control multiple decryption engines that are running asynchronously. The software is responsible for controlling and managing data traffic between the decryption engines. Special hardware provisioning may be needed to improve security.

Second, system 100 uses decryption engines running in different parts of system 100 at different frequencies. However, the overall pipeline is serial in nature and is bound by its slowest component. Furthermore, several data copies take place between graphics and system memory.

Third, system 100 may have security vulnerabilities. As data is passed from one decryption engine to another through shared memory, security vulnerabilities may arise. These buffers may be unintentionally copied from a more secure memory (e.g., system memory) to a less secure memory (e.g., graphics memory). System 100 has an additional task of ensuring all intermediate buffers are secured.

Fourth, a TRS module 131 or similar functionality is needed. A specific software module is required which increases the system complexity and increases power consumption on the platform level.

Figure 2:
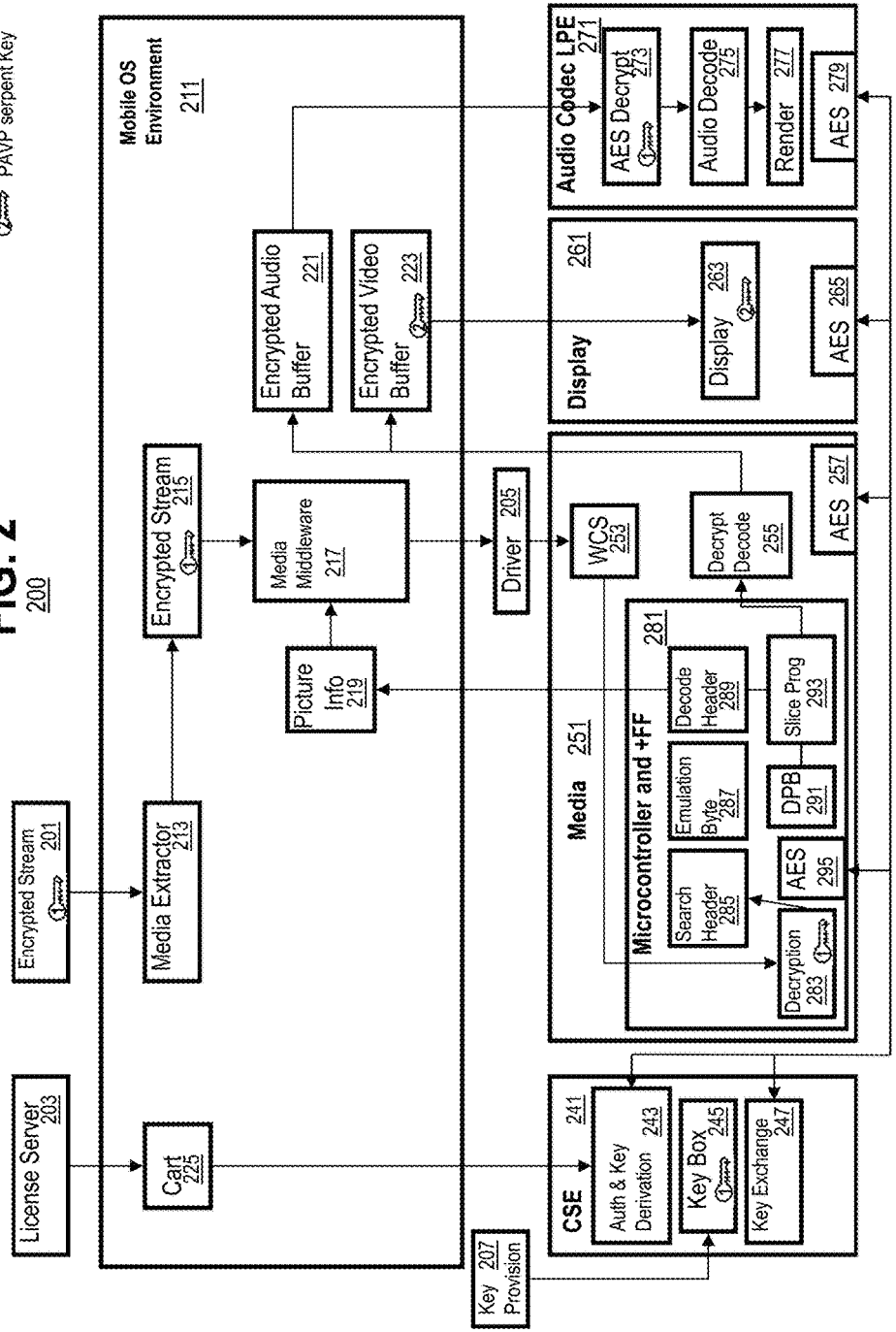
FIG. 2 illustrates one embodiment of a system to decode and decrypt a media content.

In order to overcome the drawbacks of system 100, embodiments in accordance with the present disclosure implement a system 200 as illustrated in FIG. 2. System 200 also assumes that an audio/video stream includes commands to a rendering engine, which instruct the rendering engine how to render the audio or video content. In system 200, a programmable microcontroller is added to the GPU pipeline. System 200 includes a co-processor for supporting basic encryption schemes with programmability and a co-processor for video stream parsing including hardware accelerated parsing of the encoded elements in the video stream. System 200 further includes a capability to directly program video hardware fixed function units, and a capability to process a complete content stream at a program stream or transport stream level in the device without using the CPU.

In particular, system 200 may include a Mobile OS environment 211, a computer security module 241, a media module 251, a display module 261 and an audio codec module 271. Components of system 200 may be interconnected as illustrated in FIG. 2. Alternative interconnections providing similar functionality may also be used. The mobile OS environment 211 may comprise an unprotected domain, e.g., an unencrypted domain that does not include an interface entirely within the domain between encrypted and unencrypted components. A domain may comprise a ground of processing elements that are addressable as a group with a common address.

Mobile OS environment 211 may include a media extractor module 213 configured to accept an external encrypted video module 201, an encrypted stream module 215 configured to accept the output of module 213, and a media middleware module 217 configured to accept the output of module 215. An output of media middleware module 217 is supplied to driver 205, which in turn is then supplied to media module 251. The media middleware module 217 manages settings of the decoders and decryptors based upon specific settings of the media stream (e.g., encryption type, frame rate, etc.).

Mobile OS environment 111 may further include a picture information module 219 that accepts an input from the media module 251, and supplies an output to media middleware module 217. Mobile OS environment 211 may further include an encrypted audio buffer module 221 and an encrypted video buffer module 223. Buffers modules 221, 223 each may accept an input from media module 251. Buffer module 221 may supply an output to 271, and encrypted video buffer module 223 may supply an output to display module 261. Mobile OS environment 211 may further include a cart module 225 configured to accept the output of license server module 203 and to supply an output to computer security module 241. Cart module 225 provides key storage.

Mobile OS environment 211 may further include a first processor coupled to a memory. The first processor may be used to execute functions of media middleware module 217. The memory may be used to store data and/or software modules needed to carry out functions of media middleware module 217. The memory may be further used to provide data buffers, e.g., buffers 221, 223.

Computer security module 241 manages the update and distribution of cryptographic keys to other modules within system 200 that need cryptographic keys. Computer security module 241 includes an authentication and key derivation module 243 that is configured to accept an input from cart module 225, and supply an output to key exchange module 247 and the various AES modules associated with system 200, e.g., to AES modules 295, 257, 265 and 279. key derivation module 243 derives its output from an encryption license provided by cart module 225. Computer security module 241 may further include a key box module 245 configured to accept an input from a key provision module 207. Key provision module 207 may be, for example, an external transfer device that allows at least an initial key to be provisioned. Components of computer security module 241 may be interconnected as illustrated in FIG. 2. Alternative interconnections providing similar functionality may also be used.

Media module 251 includes a microcontroller/fixed-function hardware (FF) module 281, and a command streamer module 253 that is configured to accept an input from driver 205 and provide an output to microcontroller/FF module 281. Media module 251 further includes a decrypt/decode processor module 255 that is configured to accept an input from microcontroller/FF module 281 and provide an output to encrypted audio buffer module 221 and encrypted video buffer module 223 of mobile OS environment 211, and AES module 257. Decrypt/decode processor module 255 may operate by use of a decryption key received by AES module 257. Decrypt/decode processor module 255 performs functions similar to the functions performed by header parsing module 139 of system 100.

Microcontroller/FF module 281 is configurable to provide software-based support for a variety of different encryption schemes. Microcontroller/FF module 281 includes an AES module 295, and a decryption module 283 that accepts an input from command streamer module 253 and provides an output to search header module 285. Decryption module 283 may be under program control of microcontroller/FF 281, and thus has flexibility to adapt to a variety of different encryption schemes. Decryption module 283 may use a DRM A/V decryption key received by AES module 295. Search header module 285 supplies an output to an emulation byte module 287, which in turn supplies its output to decode header module 289. Because the media stream mixes data bytes and control bytes, occasionally the data stream by mere chance may contain a sequence of data bytes that mimics a control bytes sequence. The emulation byte module 287 will search for such patterns in the data bytes, and will either remove or replace the bytes.

The combination of search header module 285, emulation byte module 287, and decode header module 289 together provide an ability for the microcontroller/FF 281 to buffer and perform decode operations on chip, thus improving flexibility simplifying the circuit and processing design, and enabling a commensurate decrease in power consumption by the mobile device housing system 200 because certain off-chip driving circuits are no longer needed.

Microcontroller/FF module 281 may further include a display pipeline buffer (DPB) module 291, which may function to rearrange video frame buffers if needed. DPB module 291 supplies an output to slice program module 293. Slice programming module 293 allows for direct programming of hardware decoders by microcontroller/FF module 281 without the involvement of a higher-level language. Slice programming module 293 supplies an output to decode header module 295. Decode header module 295 supplies an output to picture information module 219 of mobile OS environment 211. Slice programming module 293 supplies another output to decrypt/decode processor module 255. Decryption module 283 and/or decrypt/decode processor module 255 may be programmed by appropriate instructions to support one or more different encryption schemes. In some embodiments, decrypt/decode processor module 255 may process only the video portion of a media stream, e.g., by decrypting the video portion by use of the DRM A/V key, but then encrypting the video stream by a PACP key.

Decrypt/decode processor module 255 may be further configured to pass through an audio stream without decrypting it. Components of microcontroller/FF module 281 may be interconnected as illustrated in FIG. 2. Alternative interconnections providing similar functionality may also be used.

Display module 261 may include a decrypt and display module 263 configured to receive an input from encrypted display buffer module 223 and produce a display signal that may be viewed by a user. Display module 261 may further include an AES module 265, which receives a decryption key that may be used by display module 261 to decrypt the video signal. Components of display module 261 may be interconnected as illustrated in FIG. 2. Alternative interconnections providing similar functionality may also be used.

Audio codec module 271 may include an AES module 279 to receive a decryption key, an AES decrypt module 273 configured to accept an input from encrypted audio buffer module 221, decrypt the audio by use of the decryption key, and provide an output to audio decode module 275. Audio decode module 275 in turn provides an output to render module 277. Decoded and decrypted audio is rendered by render module 277, e.g., by a circuit configured to drive earbuds for use by a user. Components of audio codec module 271 may be interconnected as illustrated in FIG. 2. Alternative interconnections providing similar functionality may also be used.

With respect to key management, it is notable that although a DRM key is used for security in the GPU, no encryption or decryption keys are used in media player service 121.

In system 200, microcontroller/FF module 281 is responsible for decrypting the command stream and internally creating command buffers during the decryption process. Microcontroller/FF module 281 is able to address multiple encryption schemes due to its programmable security coprocessor. Microcontroller/FF module 281 receives a message from driver 205 indicating a type of security algorithm used for the encrypted media or media stream. Microcontroller/FF module 281 configures itself to support the indicated type of security algorithm, e.g., by executing code modules, setting flags/switches, etc., specific to the indicated type of security algorithm. Then, system 200 decrypts and parses the command stream accordingly. After parsing the command stream, microcontroller/FF module 281 programs the video and audio engines in decrypt/decode processor module 255 without any involvement by a CPU in mobile OS environment 211 or any other external processor. Microcontroller/FF module 281 also may pass noncritical data and information (e.g., feedback information) back to the CPU in mobile OS environment 211, via picture information module 219, about the video stream that microcontroller/FF module 281 is processing. For example, the data and/or information passed back may include one or more of: identification of a type of video stream, resolution, frame rate, encoding sequence and timing information, and so forth.

Embodiments in accordance with the present disclosure address the shortcomings of system 100, by providing a separate microcontroller/FF module 281 that is under the control of a graphics driver incorporated into media middleware module 217 of mobile OS environment 211. System 200 is a simpler design having less need for synchronization compared to system 100, which is complex because system 100 uses software to control multiple decryption engines that are running asynchronously. Microcontroller/FF module 281 may also operate in parallel with the other engines (not illustrated in FIG. 2) to enable better performance.

Furthermore, embodiments in accordance with the present disclosure provide improved security. In contrast to system 100, in which security vulnerabilities may arise as data is passed from one decryption engine to another through shared memory or unintentional copying, the data used by system 200 always stays in graphics memory and may be secured through standard graphics memory security techniques.

Embodiments in accordance with the present disclosure also provide more flexible support for new and emerging DRM schemes, and thus quicker commercialization and time to market. Embodiments also improve overall security of the video content through the GPU pipeline by eliminating points where decrypted content may be improperly copied or accessed. This makes embodiments more secure and hence more desirable to customers and/or content providers. Savings of the power consumption of the mobile device incorporating system 200 is made possible by reducing or eliminating the need for drivers to exchange data with external hardware modules.

Figure 3B:
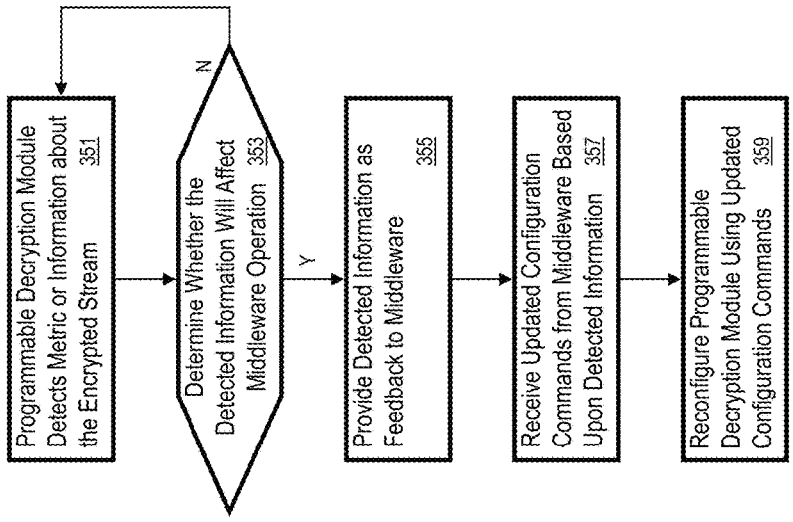
FIG. 3A-3B illustrate processes of an embodiment to decode and decrypt a media content.
Figure 3A:
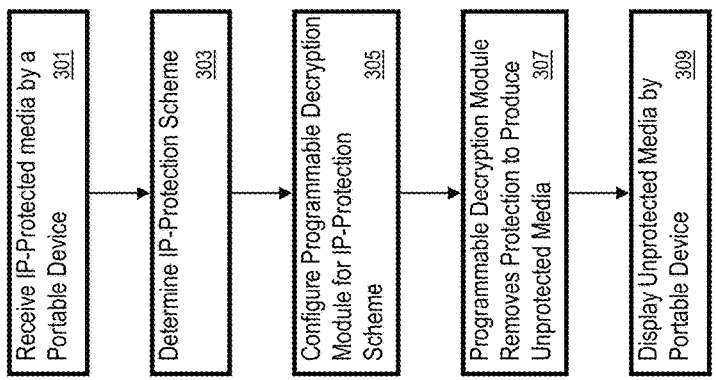

FIG. 3A illustrates a logic flow 300 in accordance with an embodiment of the present disclosure. In contrast to known solutions for decrypting and/or decoding protected media, logic flow 300 is applicable to software-based decrypting and/or decoding platforms using a separate programmable processor.

Logic flow 300 includes several advantages compared to the known art. First, in contrast to traditional decryptors and decoders, logic flow 300 avoids usage of an excessive number of modules, and consequently avoids a need for synchronization. Second, logic flow 300 provides better security by allowing for fewer opportunities for unauthorized copying of unprotected data. Third, logic flow 300 provides more flexible support for new and emerging DRM schemes.

Logic flow 300 begins at block 301, at which a portable device represented by system 200 receives an intellectual property (IP) protected media. The IP protection may be by use of, e.g., encryption, DRM, etc. The protected media may be a streaming media or may be a media read from a storage device coupled to the portable device. The protected media may be an audio data (e.g., music MP3) or video data (e.g., a subscription-based video content).

Next, control of logic flow 300 transitions to block 303, at which the IP protection scheme used by the protected media is detected.

Next, control of logic flow 300 transitions to block 305, at which a separate programmable decryption module is configured for the detected IP protection scheme. The coprocessor is separate in the sense that it is not a part of the mobile operating system of the portable device.

Next, control of logic flow 300 transitions to block 307, at which the programmable decryption module is configured to remove the IP protection, in order to produce unprotected media.

Next, control of logic flow 300 transitions to block 309, at which the decoded, unprotected media is transported to the portable device.

FIG. 3B illustrates a logic flow 350 in accordance with an embodiment of the present disclosure. Logic flow 350 provides feedback from a decryption processor (e.g., a separate programmable processor such as microcontroller/FF module 281) to an operating system environment that controls the decryption processor. Logic flow 350 may be performed by, e.g., the decryption processor.

Logic flow 350 begins at block 351, at which the decryption processor detects a metric and/or an information about the encrypted data stream. For example, the metric may indicate a state of operation of microcontroller/FF module 281 (e.g., memory or CPU utilization). Information about the encrypted data stream may include encryption parameters, metadata pertaining to the encrypted data stream, and so forth.

Next, control of logic flow 350 transitions to decision block 353, at which the decryption processor may determine whether the metric and/or other information will affect operation of the mobile OS environment, e.g., affect media middleware module 217, and in particular affect media middleware module 217 in a way that would affect the decoding process. If the outcome of decision block 353 is negative, control of logic flow 350 reverts to block 351. If the outcome of decision block 353 is positive, control of logic flow 350 proceeds to block 355.

At block 355, the decryption processor provides the metric and/or other information to the mobile OS environment. For example, a feedback path may be utilized from microcontroller/FF module 281 to picture information module 219.

Next, control of logic flow 350 transitions to block 357, at which the decryption processor receives updated configuration commands from the mobile OS environment (e.g., from media middleware module 217), the updated configuration commands being based upon the metric and/or other information that had been provided as feedback.

Next, control of logic flow 350 transitions to block 359, at which the decryption processor reconfigures itself based upon the updated configuration commands.

Figure 4:
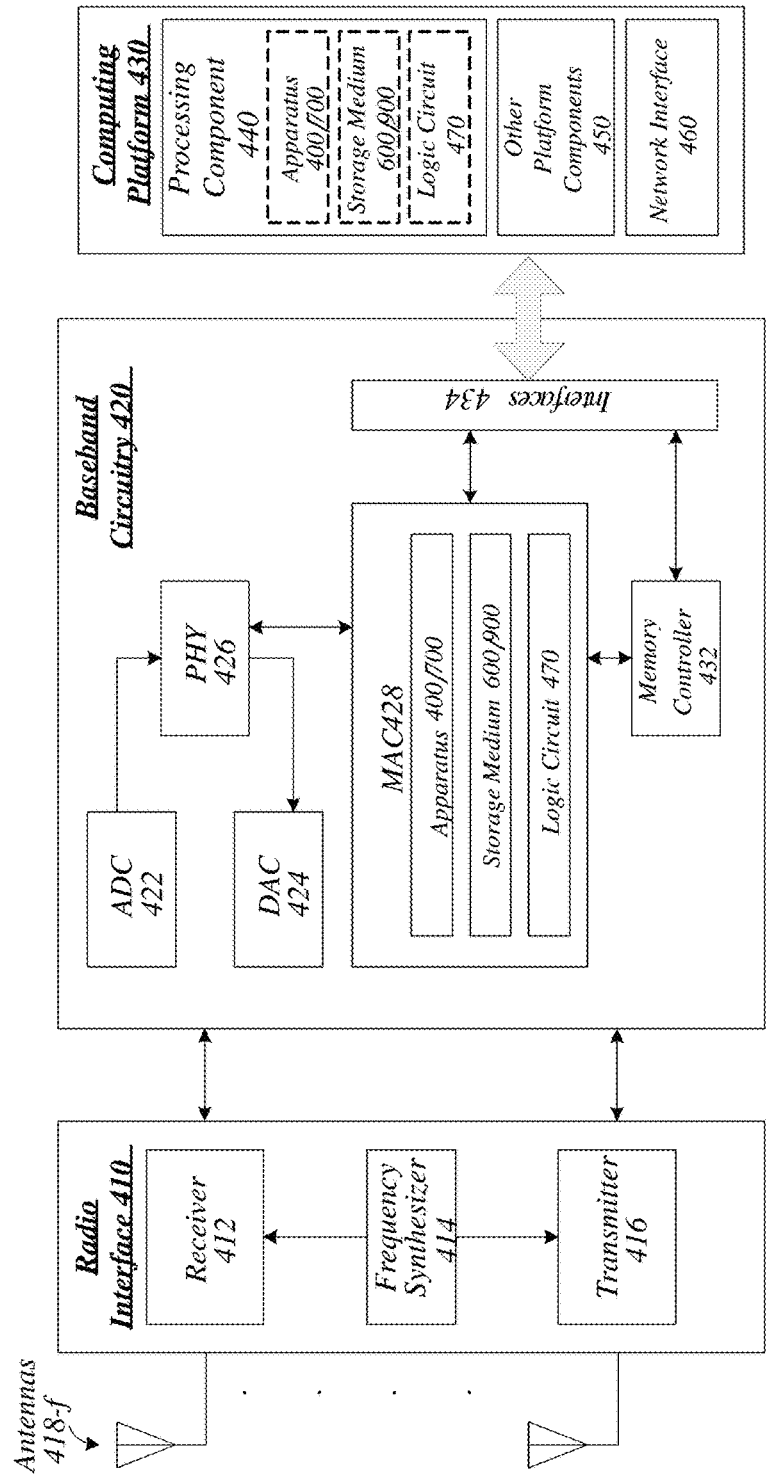
FIG. 4 illustrates one embodiment of a device.

FIG. 4 illustrates an embodiment of a device 400. In some examples, device 400 may be configured or arranged for wireless communications in a wireless network. Device 400 may implement, for example, a Wi-Fi access point, a storage medium and/or a logic circuit 470. The logic circuit 470 may include physical circuits to perform operations described for other apparatus. As shown in FIG. 4, device 400 may include a radio interface 410, baseband circuitry 420, and computing platform 430, although examples are not limited to this configuration.

The device 400 may implement some or all of the structure and/or operations for apparatus, storage medium 600/900 and/or logic circuit 470 in a single computing entity, such as entirely within a single device. The embodiments are not limited in this context.

Radio interface 410 may include a component or combination of components adapted for transmitting and/or receiving single carrier or multi-carrier modulated signals (e.g., including complementary code keying (CCK) and/or orthogonal frequency division multiplexing (OFDM) symbols and/or single carrier frequency division multiplexing (SC-FDM symbols) although the embodiments are not limited to any specific over-the-air interface or modulation scheme. Radio interface 410 may include, for example, a receiver 412, a transmitter 416 and/or a frequency synthesizer 414. Radio interface 410 may include bias controls, a crystal oscillator and/or one or more antennas 418-f. In another embodiment, radio interface 410 may use external voltage-controlled oscillators (VCOs), surface acoustic wave filters, intermediate frequency (IF) filters and/or RF filters, as desired. Due to the variety of potential RF interface designs an expansive description thereof is omitted.

Baseband circuitry 420 may communicate with radio interface 410 to process receive and/or transmit signals and may include, for example, an analog-to-digital converter 422 for down converting received signals, a digital-to-analog converter 424 for up converting signals for transmission.

Further, baseband circuitry 420 may include a baseband or physical layer (PHY) processing circuit 426 for PHY link layer processing of respective receive/transmit signals. Baseband circuitry 420 may include, for example, a processing circuit 428 for medium access control (MAC)/data link layer processing. Baseband circuitry 420 may include a memory controller 432 for communicating with MAC processing circuit 428 and/or a computing platform 430, for example, via one or more interfaces 434.

In some embodiments, PHY processing circuit 426 may include a frame construction and/or detection module, in combination with additional circuitry such as a buffer memory, to construct and/or deconstruct communication frames (e.g., containing subframes). Alternatively or in addition, MAC processing circuit 428 may share processing for certain of these functions or perform these processes independent of PHY processing circuit 426. In some embodiments, MAC and PHY processing may be integrated into a single circuit.

Computing platform 430 may provide computing functionality for device 400. As shown, computing platform 430 may include a processing component 440. In addition to, or alternatively of, baseband circuitry 420 of device 400 may execute processing operations or logic for other apparatus, a storage medium, and logic circuit 470 using the processing component 430. Processing component 440 (and/or PHY 426 and/or MAC 428) may comprise various hardware elements, software elements, or a combination of both. Examples of hardware elements may include devices, logic devices, components, processors, microprocessors, circuits, processor circuits (e.g., processor circuit 420), circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given example.

Computing platform 430 may further include other platform components 450. Other platform components 450 include common computing elements, such as one or more processors, multi-core processors, co-processors, memory units, chipsets, controllers, peripherals, interfaces, oscillators, timing devices, video cards, audio cards, multimedia input/output (I/O) components (e.g., digital displays), power supplies, and so forth. Examples of memory units may include without limitation various types of computer readable and machine readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information.

Computing platform 430 may further include a network interface 460. In some examples, network interface 460 may include logic and/or features to support network interfaces operated in compliance with one or more wireless broadband technologies such as those described in one or more standards associated with IEEE 802.11 such as IEEE 802.11ad.

Device 400 may be, for example, user equipment, a computer, a personal computer (PC), a desktop computer, a laptop computer, a notebook computer, a netbook computer, a tablet computer, other small computing devices, a smart phone, embedded electronics, a gaming console, a server, a server array or server farm, a web server, a network server, an Internet server, a work station, a mini-computer, a main frame computer, a supercomputer, a network appliance, a web appliance, a distributed computing system, multiprocessor systems, processor-based systems, or combination thereof. Accordingly, functions and/or specific configurations of device 400 described herein, may be included or omitted in various embodiments of device 400, as suitably desired. In some embodiments, device 400 may be configured to be compatible with protocols and frequencies associated with IEEE 802.11 Standards for WLANs and/or for wireless docking, although the examples are not limited in this respect.

Embodiments of device 400 may be implemented using single input single output (SISO) antenna architectures. However, certain implementations may include multiple antennas (e.g., antennas 418-f) for transmission and/or reception using adaptive antenna techniques for beamforming or spatial division multiple access (SDMA) and/or using multiple input multiple output (MIMO) communication techniques.

The components and features of device 400 may be implemented using any combination of discrete circuitry, application specific integrated circuits (ASICs), logic gates and/or single chip architectures. Further, the features of device 400 may be implemented using microcontrollers, programmable logic arrays and/or microprocessors or any combination of the foregoing where suitably appropriate. It is noted that hardware, firmware and/or software elements may be collectively or individually referred to herein as "logic" or "circuit."

It should be appreciated that the exemplary device 400 shown in the block diagram of FIG. 4 may represent one functionally descriptive example of many potential implementations. Accordingly, division, omission or inclusion of block functions depicted in the accompanying figures does not infer that the hardware components, circuits, software and/or elements for implementing these functions would be necessarily be divided, omitted, or included in embodiments.

Figure 5:
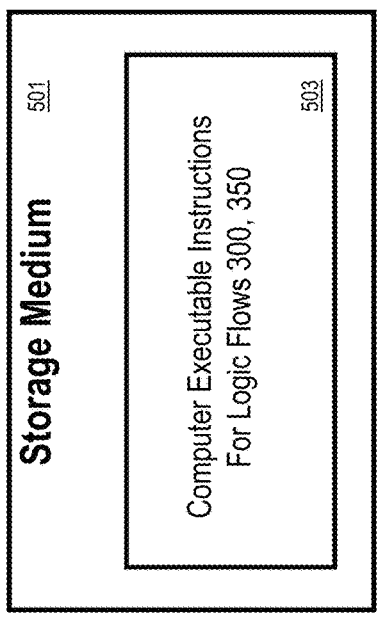
FIG. 5 illustrates one embodiment of a storage medium.

FIG. 5 illustrates an embodiment of a storage medium 500. The storage medium 500 may comprise an article of manufacture. In one embodiment, the storage medium 500 may comprise any non-transitory computer readable medium or machine readable medium, such as an optical, magnetic or semiconductor storage. The storage medium may store various types of computer executable instructions, such as instructions to implement logic flow 300. Examples of a computer readable or machine readable storage medium may include any tangible media capable of storing electronic data, including volatile memory or non-volatile memory, removable or non-removable memory, erasable or non-erasable memory, writeable or re-writeable memory, and so forth. Examples of computer executable instructions may include any suitable type of code, such as source code, compiled code, interpreted code, executable code, static code, dynamic code, object-oriented code, visual code, and the like. The embodiments are not limited in this context.

Figure 6:
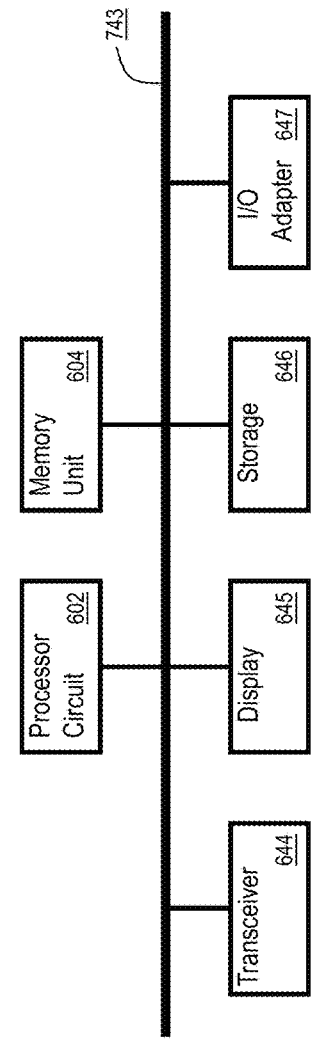
FIG. 6 illustrates one embodiment of a second system.

FIG. 6 illustrates one embodiment of a system 600. In various embodiments, system 600 may be representative of a system or architecture suitable for use with one or more embodiments described herein, such as system 200 of FIG. 2, logic flow 300 of FIG. 3A, logic flow 350 of FIG. 3B, and/or storage medium 500 of FIG. 5. The embodiments are not limited in this respect.

As shown in FIG. 6, system 600 may include multiple elements. One or more elements may be implemented using one or more circuits, components, registers, processors, software subroutines, modules, or any combination thereof, as desired for a given set of design or performance constraints. Although FIG. 6 shows a limited number of elements in a certain topology by way of example, it can be appreciated that more or less elements in any suitable topology may be used in system 600 as desired for a given implementation. The embodiments are not limited in this context.

In various embodiments, system 600 may include a processor circuit 602. Processor circuit 602 may be implemented using any processor or logic device.

In one embodiment, system 600 may include a memory unit 604 to couple to processor circuit 602. Memory unit 604 may be coupled to processor circuit 602 via communications bus 643, or by a dedicated communications bus between processor circuit 602 and memory unit 604, as desired for a given implementation. Memory unit 604 may be implemented using any machine-readable or computer-readable media capable of storing data, including both volatile and non-volatile memory, and may be the same as or similar to buffers 221, 223 of FIG. 2. In some embodiments, the machine-readable or computer-readable medium may include a non-transitory medium. The embodiments are not limited in this context.

In various embodiments, system 600 may include a transceiver 644. Transceiver 644 may include one or more radios capable of transmitting and receiving signals using various suitable wireless communications techniques, and may be the same as or similar to transceiver 516 of FIG. 5.

In various embodiments, system 600 may include a display 645. Display 645 may comprise any display device capable of displaying information received from processor circuit 602, and may be the same as or similar to decrypt and display module 263 of FIG. 2. The embodiments are not limited in this context.

In various embodiments, system 600 may include storage 646. Storage 646 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In embodiments, storage 646 may include technology to increase the storage performance enhanced protection for valuable digital media when multiple hard drives are included, for example. Further examples of storage 646 may include a hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of DVD devices, a tape device, a cassette device, or the like. The embodiments are not limited in this context.

In various embodiments, system 600 may include one or more I/O adapters 647. Examples of I/O adapters 647 may include Universal Serial Bus (USB) ports/adapters, IEEE 1394 Firewire ports/adapters, and so forth. The embodiments are not limited in this context.

Figure 7:
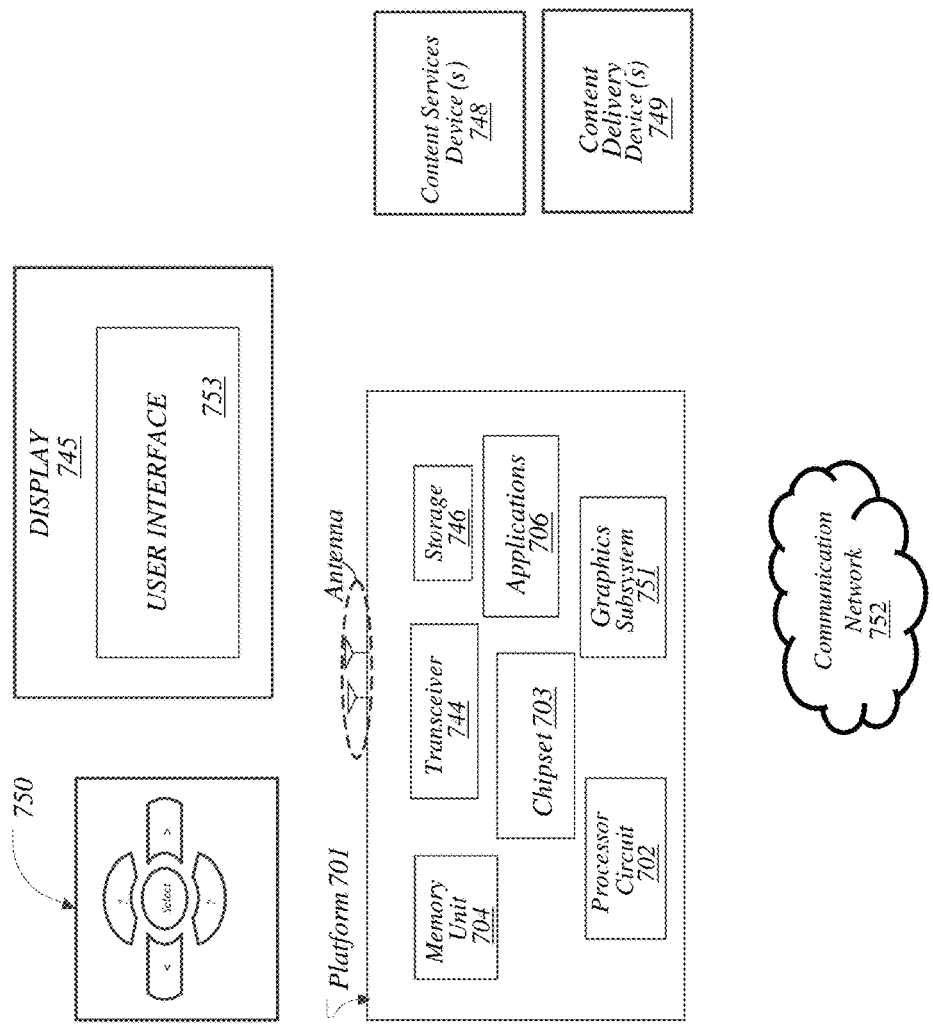
FIG. 7 illustrates one embodiment of a third system.

FIG. 7 illustrates an embodiment of a system 700. In various embodiments, system 700 may be representative of a system or architecture suitable for use with one or more embodiments described herein, such as system 200 of FIG. 2, logic flow 300 of FIG. 3A, logic flow 350 of FIG. 3B, storage medium 500 of FIG. 5, and/or system 600 of FIG. 6. The embodiments are not limited in this respect.

As shown in FIG. 7, system 700 may include multiple elements. One or more elements may be implemented using one or more circuits, components, registers, processors, software subroutines, modules, or any combination thereof, as desired for a given set of design or performance constraints. Although FIG. 7 shows a limited number of elements in a certain topology by way of example, it can be appreciated that more or less elements in any suitable topology may be used in system 700 as desired for a given implementation. The embodiments are not limited in this context.

In embodiments, system 700 may be a media system although system 700 is not limited to this context. For example, system 700 may be incorporated into a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

In embodiments, system 700 includes a platform 701 coupled to a display 745. Platform 701 may receive content from a content device such as content services device(s) 748 or content delivery device(s) 749 or other similar content sources. A navigation controller 750 including one or more navigation features may be used to interact with, for example, platform 701 and/or display 745. Each of these components is described in more detail below.

In embodiments, platform 701 may include any combination of a processor circuit 702, chipset 703, memory unit 704, transceiver 744, storage 746, applications 751, and/or graphics subsystem 752. Chipset 703 may provide intercommunication among processor circuit 702, memory unit 704, transceiver 744, storage 746, applications 751, and/or graphics subsystem 752. For example, chipset 703 may include a storage adapter (not depicted) capable of providing intercommunication with storage 746.

Processor circuit 702 may be implemented using any processor or logic device, and may be the same as or similar to processor circuit 602 in FIG. 6.

Memory unit 704 may be implemented using any machine-readable or computer-readable media capable of storing data, and may be the same as or similar to memory unit 604 in FIG. 6.

Transceiver 744 may include one or more radios capable of transmitting and receiving signals using various suitable wireless communications techniques, and may be the same as or similar to transceiver 644 in FIG. 6.

Display 745 may include any television type monitor or display, and may be the same as or similar to display 645 in FIG. 6.

Storage 746 may be implemented as a non-volatile storage device, and may be the same as or similar to storage 646 in FIG. 6.

Graphics subsystem 752 may perform processing of images such as still or video for display. Graphics subsystem 752 may be a graphics processing unit (GPU) or a visual processing unit (VPU), for example. An analog or digital interface may be used to communicatively couple graphics subsystem 752 and display 745. For example, the interface may be any of a High-Definition Multimedia Interface, DisplayPort, wireless HDMI, and/or wireless HD compliant techniques. Graphics subsystem 752 could be integrated into processor circuit 702 or chipset 703. Graphics subsystem 752 could be a stand-alone card communicatively coupled to chipset 703.

The graphics and/or video processing techniques described herein may be implemented in various hardware architectures. For example, graphics and/or video functionality may be integrated within a chipset. Alternatively, a discrete graphics and/or video processor may be used. As still another embodiment, the graphics and/or video functions may be implemented by a general purpose processor, including a multi-core processor. In a further embodiment, the functions may be implemented in a consumer electronics device.

In embodiments, content services device(s) 748 may be hosted by any national, international and/or independent service and thus accessible to platform 701 via the Internet, for example. Content services device(s) 748 may be coupled to platform 701 and/or to display 745. Platform 701 and/or content services device(s) 748 may be coupled to a network 753 to communicate (e.g., send and/or receive) media information to and from network 753. Content delivery device(s) 749 also may be coupled to platform 701 and/or to display 745.

In embodiments, content services device(s) 748 may include a cable television box, personal computer, network, telephone, Internet enabled devices or appliance capable of delivering digital information and/or content, and any other similar device capable of unidirectionally or bidirectionally communicating content between content providers and platform 701 and/display 745, via network 753 or directly. It will be appreciated that the content may be communicated unidirectionally and/or bidirectionally to and from any one of the components in system 700 and a content provider via network 753. Examples of content may include any media information including, for example, video, music, medical and gaming information, and so forth.

Content services device(s) 748 receives content such as cable television programming including media information, digital information, and/or other content. Examples of content providers may include any cable or satellite television or radio or Internet content providers. The provided examples are not meant to limit embodiments of the disclosed subject matter.

In embodiments, platform 701 may receive control signals from navigation controller 750 having one or more navigation features. The navigation features of navigation controller 750 may be used to interact with a user interface 754, for example. In embodiments, navigation controller 750 may be a pointing device that may be a computer hardware component (specifically human interface device)

that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of navigation controller 750 may be echoed on a display (e.g., display 745) by movements of a pointer, cursor, focus ring, or other visual indicators displayed on the display. For example, under the control of software applications 751, the navigation features located on navigation controller 750 may be mapped to virtual navigation features displayed on user interface 754. In embodiments, navigation controller 750 may not be a separate component but integrated into platform 701 and/or display 745. Embodiments, however, are not limited to the elements or in the context shown or described herein.

In embodiments, drivers (not shown) may include technology to enable users to instantly turn on and off platform 701 like a television with the touch of a button after initial boot-up, when enabled, for example. Program logic may allow platform 701 to stream content to media adaptors or other content services device(s) 748 or content delivery device(s) 749 when the platform is turned "off." In addition, chip set 703 may include hardware and/or software support for 5.1 surround sound audio and/or high definition 7.1 surround sound audio, for example. Drivers may include a graphics driver for integrated graphics platforms. In embodiments, the graphics driver may include a peripheral component interconnect (PCI) Express graphics card.

In various embodiments, any one or more of the components shown in system 700 may be integrated. For example, platform 701 and content services device(s) 748 may be integrated, or platform 701 and content delivery device(s) 749 may be integrated, or platform 701, content services device(s) 748, and content delivery device(s) 749 may be integrated, for example. In various embodiments, platform 701 and display 745 may be an integrated unit. Display 745 and content service device(s) 748 may be integrated, or display 745 and content delivery device(s) 749 may be integrated, for example. These examples are not meant to limit the disclosed subject matter.

In various embodiments, system 700 may be implemented as a wireless system, a wired system, or a combination of both. When implemented as a wireless system, system 700 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 700 may include components and interfaces suitable for communicating over wired communications media, such as I/O adapters, physical connectors to connect the I/O adapter with a corresponding wired communications medium, a network interface card (NIC), disc controller, video controller, audio controller, and so forth. Examples of wired communications media may include a wire, cable, metal leads, printed circuit board (PCB), backplane, switch fabric, semiconductor material, twisted-pair wire, co-axial cable, fiber optics, and so forth.

Platform 701 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The embodiments, however, are not limited to the elements or in the context shown or described in FIG. 7.

Figure 8:
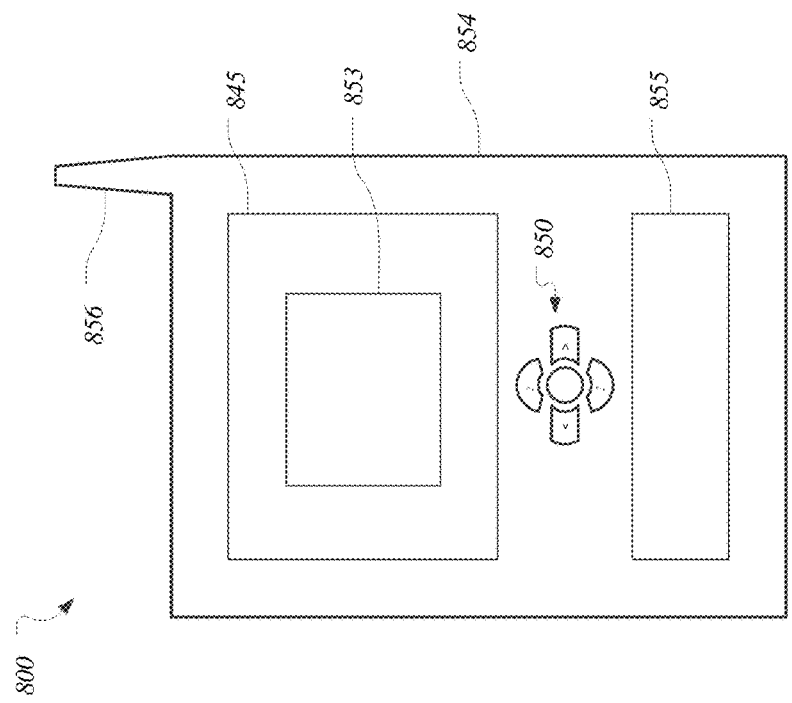
FIG. 8 illustrates one embodiment of a device.

As described above, system 700 may be embodied in varying physical styles or form factors. FIG. 8 illustrates embodiments of a small form factor device 800 in which system 700 may be embodied. In embodiments, for example, device 800 may be implemented as a mobile computing device having wireless capabilities. A mobile computing device may refer to any device having a processing system and a mobile power source or supply, such as one or more batteries, for example.

As described above, examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

Examples of a mobile computing device also may include computers that are arranged to be worn by a person, such as a wrist computer, finger computer, ring computer, eyeglass computer, belt-clip computer, arm-band computer, shoe computers, clothing computers, and other wearable computers. In embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The embodiments are not limited in this context.

As shown in FIG. 8, device 800 may include a display 845, a navigation controller 850, a user interface 854, a housing 855, an I/O device 856, and an antenna 857. Display 845 may include any suitable display unit for displaying information appropriate for a mobile computing device, and may be the same as or similar to display 745 in FIG. 7. Navigation controller 850 may include one or more navigation features which may be used to interact with user interface 854, and may be the same as or similar to navigation controller 750 in FIG. 7. I/O device 856 may include any suitable I/O device for entering information into a mobile computing device. Examples for I/O device 856 may include an alphanumeric keyboard, a numeric keypad, a touch pad, input keys, buttons, switches, rocker switches, microphones, speakers, voice recognition device and software, and so forth. Information also may be entered into device 800 by way of microphone. Such information may be digitized by a voice recognition device. The embodiments are not limited in this context.

A logic flow may be implemented in software, firmware, and/or hardware. In software and firmware embodiments, a logic flow may be implemented by computer executable instructions stored on at least one non-transitory computer readable medium or machine readable medium, such as an optical, magnetic or semiconductor storage. The embodiments are not limited in this context.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor. Some embodiments may be implemented, for example, using a machine-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

The following examples pertain to further embodiments:

An apparatus to decrypt an encrypted media stream may comprise a receiver to receive an encrypted media stream, an extraction module to extract an encryption characteristic of the encrypted media stream, a first processor to produce configuration commands from the extracted encryption characteristic, and a second processor to receive the encrypted media stream and the configuration commands, and to produce decrypted media based upon a decryption scheme indicated by the configuration commands.

With respect to such an apparatus, the processor may be located in an unprotected domain.

Such an apparatus may further comprise decrypted media buffers in the unprotected domain.

With respect to such an apparatus, the encrypted media stream comprising a streaming media encrypted by Advanced Encryption Standard (AES).

Such an apparatus may further comprise a a feedback communication path from the second processor to the first processor.

With respect to such an apparatus, the feedback communication path to adjust configuration of the first processor.

A system to decrypt an encrypted media stream may comprise a receiver to receive an encrypted media stream, an extraction module to extract an encryption characteristic of the encrypted media stream, a first processor to produce configuration commands from the extracted encryption characteristic, a second processor to receive the encrypted media stream and the configuration commands, and to produce decrypted media based upon a decryption scheme indicated by the configuration commands, and a key distribution module, to distribute a decryption key to the second processor.

With respect to such a system, the first processor may be located in an unprotected domain.

With respect to such a system, the system may further comprise decrypted media buffers in the unprotected domain.

With respect to such a system, the encrypted media stream may comprise a streaming media encrypted by Advanced Encryption Standard (AES).

With respect to such a system, the system may further comprise a feedback communication path from the second processor to the first processor.

With respect to such a system, the feedback communication path used to adjust configuration of the first processor.

With respect to such a system, the system may further comprise an interface to a user-video interface and an interface to a user-audio interface.

With respect to such a system, the key distribution module may further comprise a first input to receive an encryption license, a second input to receive a key provision, and a processor to produce the decryption key from the encryption license and the key provision.

At least one machine-readable medium may comprise a plurality of instructions that, in response to being executed on a computing device, may cause the computing device to receive an encrypted media stream, extract an encryption characteristic of the encrypted media stream, produce configuration commands from the extracted encryption characteristic by use of a first processor, and receive the encrypted media stream and the configuration commands, and to produce decrypted media based upon a decryption scheme indicated by the configuration commands, by use of a second processor.

With respect to such at least one machine-readable medium, the first processor may be located in an unprotected domain.

Such at least one machine-readable medium may comprise instructions that, in response to being executed on the computing device, may further cause the computing device to store decrypted media in the unprotected domain.

With respect to such at least one machine-readable medium, the encrypted media stream may further comprise a streaming media encrypted by Advanced Encryption Standard (AES).

Such at least one machine-readable medium may comprise instructions that, in response to being executed on the computing device, may further cause the computing device to provide a feedback communication path from the second processor to the first processor.

Such at least one machine-readable medium may comprise instructions that, in response to being executed on the computing device, may further cause the computing device to use information from the feedback communication path used to adjust configuration of the first processor.

A method, by a processor circuit, to decrypt an encrypted media stream may comprise receiving an encrypted media stream, extracting an encryption characteristic of the encrypted media stream, producing, by a first processor, configuration commands from the extracted encryption characteristic, receiving, by a second processor, the encrypted media stream and the configuration commands, and producing, by the second processor, decrypted media based upon a decryption scheme indicated by the configuration commands.

With respect to such a method, the first processor may be located in an unprotected domain.

Such a method may further comprise storing decrypted media in the unprotected domain.

With respect to such a method, the encrypted media stream may further comprise a streaming media encrypted by Advanced Encryption Standard (AES).

Such a method may further comprise providing feedback from the second processor to the first processor.

With respect to such a method, the feedback may adjust configuration of the first processor.

Such a method may further comprise providing decrypted video to a user-video interface and providing decrypted audio to a user-audio interface.

Such a method may further comprise receiving an encryption license, receiving a key provision, and producing the decryption key from the encryption license and the key provision.

A system to decrypt an encrypted media stream may comprise means for receiving an encrypted media stream, means for extracting an encryption characteristic of the encrypted media stream, means for producing configuration commands from the extracted encryption characteristic, means for receiving the encrypted media stream and the configuration commands, and means for producing decrypted media based upon a decryption scheme indicated by the configuration commands.

With respect to such a system, the means for producing configuration commands may be located in an unprotected domain.

Such a system may further comprise a means for storing decrypted media in the unprotected domain.

With respect to such a system, the encrypted media stream may comprise a streaming media encrypted by Advanced Encryption Standard (AES).

Such a system may further comprise a means for providing feedback from the means for producing decrypted media to the means for producing configuration commands.

With respect to such a system, the feedback may be used to adjust configuration of the means for producing configuration commands.

Such a system may further comprise a means for providing decrypted video to a user-video interface and means for providing decrypted audio to a user-audio interface.

Such a system may further comprise a means for receiving an encryption license, a means for receiving a key provision, and a means for producing the decryption key from the encryption license and the key provision.

Numerous specific details have been set forth herein to provide a thorough understanding of the embodiments. It will be understood by those skilled in the art, however, that the embodiments may be practiced without these specific details. In other instances, well-known operations, components, and circuits have not been described in detail so as not to obscure the embodiments. It can be appreciated that the specific structural and functional details disclosed herein may be representative and do not necessarily limit the scope of the embodiments.

Some embodiments may be described using the expression "coupled" and "connected" along with their derivatives. These terms are not intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within the computing system's registers and/or memories into other data similarly represented as physical quantities within the computing system's memories, registers or other such information storage, transmission or display devices. The embodiments are not limited in this context.

It should be noted that the methods described herein do not have to be executed in the order described, or in any particular order. Moreover, various activities described with respect to the methods identified herein can be executed in serial or parallel fashion.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. It is to be understood that the above description has been made in an illustrative fashion, and not a restrictive one. Combinations of the above embodiments, and other embodiments not specifically described herein will be apparent to those of skill in the art upon reviewing the above description. Thus, the scope of various embodiments includes any other applications in which the above compositions, structures, and methods are used.

It is emphasized that the Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate preferred embodiment. In the appended claims, the terms "including" and "in which" are used as the plain-English equivalents of the respective terms "comprising" and "wherein," respectively. Moreover, the terms "first," "second," and "third," etc. are used merely as labels, and are not intended to impose numerical requirements on their objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. An apparatus to decrypt an encrypted media stream, comprising:
    a receiver to receive an encrypted media stream;
    a first processor component to execute a graphics driver, the graphics driver to generate a message indicating a type of algorithm used to encrypt at least video in the encrypted media stream, the first processor component comprising a central processing unit (CPU) located in an unprotected domain of an operating system of a mobile device;
    a second processor component to receive the encrypted media stream and the message indicating the type of algorithm, and to decrypt at least the video of the encrypted media stream using the indicated algorithm and a first key, the second processor component to be controlled by the graphics driver executed by the first processor component;
    a feedback communication path from the second processor component to the first processor component, the second processor component to detect a metric about the encrypted media stream, determine the metric will affect operation of an operating system executed by the first processor component, and pass, after decryption, feedback information descriptive of the encrypted media stream and the metric to the first processor component via the feedback communication path; and
    a media buffer in the unprotected domain from which the video is retrieved to be displayed, the second processor component to re-encrypt at least the video using a second key prior to storage of at least the video in the media buffer.

2. The apparatus of claim 1, the encrypted media stream comprising a streaming media encrypted by Advanced Encryption Standard (AES).

3. The apparatus of claim 1, the feedback information to indicate at least one of a type of video stream, resolution, frame rate, encoding sequence or timing information associated with at least the video.

4. A system to decrypt an encrypted media stream, comprising:
    a receiver to receive an encrypted media stream;
    a first processor circuit to execute a graphics driver, the graphics driver to generate a message indicating a type of algorithm used to encrypt at least video in the encrypted media stream, the first processor circuit comprising a central processing unit (CPU) located in an unprotected domain of an operating system of a mobile device;
    a second processor circuit to receive the encrypted media stream and the message indicating the type of algorithm, and to decrypt at least the video of the encrypted media stream using the indicated algorithm and a decryption key, the second processor circuit to be controlled by the graphics driver executed by the first processor circuit;
    a key distribution module to distribute the decryption key to the second processor circuit;
    a feedback communication path from the second processor circuit to the first processor circuit, the second processor circuit to detect a metric about the encrypted media stream, determine the metric will affect operation of an operating system executed by the first processor circuit, and pass, after decryption, feedback information descriptive of the encrypted media stream and the metric to the first processor circuit via the feedback communication path; and
    a media buffer in the unprotected domain from which the video is retrieved to be displayed, the second processor circuit to re-encrypt at least the video using another key prior to storage of at least the video in the media buffer.

5. The system of claim 4, the encrypted media stream comprising a streaming media encrypted by Advanced Encryption Standard (AES).

6. The system of claim 4, the feedback information to indicate at least one of a type of video stream, resolution, frame rate, encoding sequence or timing information associated with at least the video.

7. The system of claim 4, further comprising an interface to a user-video interface and an interface to a user-audio interface.

8. The system of claim 4, the key distribution module further comprising:
    a first input to receive an encryption license;
    a second input to receive a key provision; and
    a processor to produce the decryption key from the encryption license and the key provision.

9. At least one machine-readable medium comprising a plurality of instructions that, in response to being executed on a computing device, cause the computing device to:
    receive an encrypted media stream;
    execute a graphics driver at a first processor component, the graphics driver to generate a message indicating a type of algorithm used to encrypt at least video in the encrypted media stream, the first processor component comprising a central processing unit (CPU) located in an unprotected domain of an operating system of a mobile device;
    receive, at a second processor component, the encrypted media stream and the message indicating the type of algorithm, and decrypt, at the second processor component, at least the video of the encrypted media stream using the indicated algorithm and a first key, the second processor component to be controlled by the graphics driver executed at the first processor component; and
    detect, at the second processor component, a metric about the encrypted media stream;
    determine, at the second processor component, the metric will affect operation of an operating system executed by the first processor component;
    after decryption, pass feedback information descriptive of the encrypted media stream and the metric from the second processor component to the first processor component via a feedback communication path from the second processor component to the first processor component; and re-encrypt at least the video at the second processor component using a second key and to store at least the video in a media buffer in the unprotected domain following the re-encryption.

10. The at least one machine-readable medium of claim 9, the encrypted media stream comprising a streaming media encrypted by Advanced Encryption Standard (AES).

11. The at least one machine-readable medium of claim 9, the feedback information to indicate at least one of a type of video stream, resolution, frame rate, encoding sequence or timing information associated with at least the video.

* * * * *